(12) United States Patent
Watson

(10) Patent No.: US 10,266,118 B2
(45) Date of Patent: *Apr. 23, 2019

(54) PROCESS FOR PROVIDING AN INTERIOR REARVIEW MIRROR ASSEMBLY

(71) Applicant: MAGNA MIRRORS OF AMERICA, INC., Holland, MI (US)

(72) Inventor: Ryan W. Watson, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/161,712

(22) Filed: May 23, 2016

(65) Prior Publication Data

US 2016/0264053 A1 Sep. 15, 2016

Related U.S. Application Data

(63) Continuation of application No. 14/071,085, filed on Nov. 4, 2013, now Pat. No. 9,352,691.

(60) Provisional application No. 61/729,111, filed on Nov. 21, 2012, provisional application No. 61/722,392, filed on Nov. 5, 2012.

(51) Int. Cl.
*B60R 1/04* (2006.01)
*G02B 7/182* (2006.01)

(52) U.S. Cl.
CPC ............... *B60R 1/04* (2013.01); *G02B 7/182* (2013.01)

(58) Field of Classification Search
None
See application file for complete search history.

(56) References Cited

U.S. PATENT DOCUMENTS

| | | | |
|---|---|---|---|
| 541,727 | A | 6/1895 | Dennis |
| 1,521,508 | A | 12/1924 | Denoux |
| 1,800,797 | A | 4/1931 | Hoople |
| 1,857,095 | A | 5/1932 | Glowacki |
| 2,414,223 | A | 1/1947 | De Virgilis |
| 2,456,182 | A | 12/1948 | Goble |
| 2,763,188 | A | 9/1956 | Bertell |
| 2,856,815 | A | 10/1958 | Ross |

(Continued)

FOREIGN PATENT DOCUMENTS

| GB | 1132384 | 10/1968 |
|---|---|---|
| WO | WO 2003/095269 | 11/2003 |

(Continued)

*Primary Examiner* — Jennifer D. Carruth
(74) *Attorney, Agent, or Firm* — Honigman LLP

(57) ABSTRACT

A process for providing an interior rearview mirror assembly for a vehicle includes providing a mirror reflective element and forming a mirror backplate and a mounting base, with the mounting base formed separate from the mirror backplate. The mounting base is configured for attachment at an interior portion of a vehicle and includes a ball member. A socket element is formed separate from the mirror backplate and separate from the mounting base, and the socket element includes a socket member. The ball member of the mounting base is inserted into the socket member of the socket element to form a ball and socket joint whereby the mounting base pivotally attaches to the socket element. With the mirror backplate attached at the mirror reflective element, the socket element, with the mounting base pivotally attached thereto, is attached to the mirror backplate.

23 Claims, 8 Drawing Sheets

(56) References Cited

U.S. PATENT DOCUMENTS

| | | |
|---|---|---|
| 2,921,808 A | 1/1960 | David |
| 2,973,980 A | 3/1961 | Vogt et al. |
| 3,009,712 A | 11/1961 | Williams |
| 3,022,096 A | 2/1962 | Schwartz |
| 3,104,897 A | 9/1963 | Berger |
| 3,177,020 A | 4/1965 | Dumpis |
| 3,367,616 A | 2/1968 | Bausch et al. |
| 3,374,016 A | 3/1968 | Melton et al. |
| 3,448,553 A | 6/1969 | Herr et al. |
| 3,498,579 A | 3/1970 | Vicary |
| 3,530,495 A | 9/1970 | Kindel |
| 3,601,352 A | 8/1971 | Jensen et al. |
| 3,622,112 A | 11/1971 | Stroh |
| 3,635,435 A | 1/1972 | Perison, Sr. |
| 3,774,996 A | 11/1973 | Donnelly |
| 3,841,769 A | 10/1974 | Bowerman |
| 3,870,404 A | 3/1975 | Wilson et al. |
| 4,254,931 A | 3/1981 | Aikens et al. |
| 4,319,806 A | 3/1982 | Brandenburg |
| 4,359,264 A | 11/1982 | Zeigler et al. |
| 4,382,572 A | 5/1983 | Thompson |
| 4,435,042 A | 3/1984 | Wood et al. |
| 4,436,371 A | 3/1984 | Wood et al. |
| 4,492,488 A | 1/1985 | Warshawsky |
| 4,524,941 A | 6/1985 | Wood et al. |
| 4,614,412 A | 9/1986 | Cohen |
| 4,632,348 A | 12/1986 | Keesling et al. |
| 4,646,210 A | 2/1987 | Skogler et al. |
| 4,679,906 A | 7/1987 | Brandenburg |
| 4,712,879 A | 12/1987 | Lynam et al. |
| 4,807,096 A | 2/1989 | Skogler et al. |
| 4,822,140 A | 4/1989 | Mittelhauser |
| 4,826,289 A | 5/1989 | Vandenbrink et al. |
| 4,882,565 A | 11/1989 | Gallmeyer |
| 4,930,742 A | 6/1990 | Schofield et al. |
| 4,936,533 A | 6/1990 | Adams et al. |
| 4,948,242 A | 8/1990 | Desmond et al. |
| 5,058,851 A | 10/1991 | Lawlor et al. |
| 5,073,012 A | 12/1991 | Lynam |
| 5,076,673 A | 12/1991 | Lynam et al. |
| 5,100,093 A | 3/1992 | Rawlinson |
| 5,100,095 A | 3/1992 | Haan et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,308,247 A | 5/1994 | Dyrdek |
| 5,327,288 A | 7/1994 | Wellington et al. |
| 5,406,414 A | 4/1995 | O'Farrell et al. |
| 5,521,760 A | 5/1996 | De Young et al. |
| 5,525,264 A | 6/1996 | Cronin et al. |
| 5,555,136 A | 9/1996 | Waldmann et al. |
| 5,567,360 A | 10/1996 | Varaprasad et al. |
| 5,572,354 A | 11/1996 | Desmond et al. |
| 5,576,687 A | 11/1996 | Blank et al. |
| 5,582,383 A | 12/1996 | Mertens et al. |
| 5,610,756 A | 3/1997 | Lynam et al. |
| 5,632,092 A | 5/1997 | Blank et al. |
| 5,668,663 A | 9/1997 | Varaprasad et al. |
| 5,669,698 A | 9/1997 | Veldman et al. |
| 5,671,996 A | 9/1997 | Bos et al. |
| 5,673,994 A | 10/1997 | Fant, Jr. et al. |
| 5,680,263 A | 10/1997 | Zimmermann et al. |
| 5,724,187 A | 3/1998 | Varaprasad et al. |
| 5,798,688 A | 8/1998 | Schofield et al. |
| 5,820,097 A | 10/1998 | Spooner |
| 5,878,370 A | 3/1999 | Olson |
| 5,910,854 A | 6/1999 | Varaprasad et al. |
| 5,984,482 A | 11/1999 | Rumsey et al. |
| 6,002,511 A | 12/1999 | Varaprasad et al. |
| 6,124,886 A | 9/2000 | DeLine et al. |
| 6,154,306 A | 11/2000 | Varaprasad et al. |
| 6,178,034 B1 | 1/2001 | Allemand et al. |
| 6,222,460 B1 | 4/2001 | DeLine et al. |
| 6,227,675 B1 | 5/2001 | Mertens et al. |
| 6,227,689 B1 | 5/2001 | Miller |
| 6,229,319 B1 | 5/2001 | Johnson |
| 6,250,148 B1 | 6/2001 | Lynam |
| 6,315,421 B1 | 11/2001 | Apfelbeck et al. |
| 6,318,870 B1 | 11/2001 | Spooner et al. |
| 6,326,613 B1 | 12/2001 | Heslin et al. |
| 6,329,925 B1 | 12/2001 | Skiver et al. |
| 6,341,523 B2 | 1/2002 | Lynam |
| 6,386,742 B1 | 5/2002 | DeLine et al. |
| 6,428,172 B1 | 8/2002 | Hutzel et al. |
| 6,439,755 B1 | 8/2002 | Fant, Jr. et al. |
| 6,483,438 B2 | 11/2002 | DeLine et al. |
| 6,501,387 B2 | 12/2002 | Skiver et al. |
| 6,523,964 B2 | 2/2003 | Schofield et al. |
| 6,540,193 B1 | 4/2003 | DeLine |
| 6,593,565 B2 | 7/2003 | Heslin et al. |
| 6,598,980 B2 | 7/2003 | Marusawa et al. |
| 6,672,744 B2 | 1/2004 | Deline et al. |
| 6,690,268 B2 | 2/2004 | Schofield et al. |
| 6,774,356 B2 | 8/2004 | Heslin et al. |
| 6,795,111 B1 | 9/2004 | Mazzili |
| 6,824,281 B2 | 11/2004 | Schofield et al. |
| 6,847,487 B2 | 1/2005 | Burgner |
| 6,877,709 B2 | 4/2005 | March et al. |
| 6,877,888 B2 | 4/2005 | DeLine et al. |
| 6,983,920 B2 | 1/2006 | DeLine |
| 7,004,593 B2 | 2/2006 | Weller et al. |
| 7,075,511 B1 | 7/2006 | Mousseau et al. |
| 7,110,156 B2 | 9/2006 | Lawlor et al. |
| 7,156,358 B2 | 1/2007 | March et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,209,278 B2 | 4/2007 | Lawlor et al. |
| 7,249,860 B2 | 7/2007 | Kulas et al. |
| 7,255,451 B2 | 8/2007 | McCabe et al. |
| 7,264,217 B2 | 9/2007 | DeLine et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,370,983 B2 | 5/2008 | DeWind et al. |
| 7,446,650 B2 | 11/2008 | Schofield et al. |
| 7,510,287 B2 | 3/2009 | Hook |
| 7,538,316 B2 | 5/2009 | Heslin et al. |
| 7,626,749 B2 | 12/2009 | Baur et al. |
| 7,855,755 B2 | 12/2010 | Weller et al. |
| 8,451,332 B2 | 5/2013 | Rawlings |
| 8,851,690 B2 | 10/2014 | Uken et al. |
| 9,352,691 B2 | 5/2016 | Watson |
| 2003/0117728 A1 | 6/2003 | Hutzel et al. |
| 2003/0128131 A1 | 7/2003 | Skiver et al. |
| 2005/0078389 A1 | 4/2005 | Kulas et al. |
| 2006/0038668 A1 | 2/2006 | DeWard et al. |
| 2006/0050018 A1 | 3/2006 | Hutzel et al. |
| 2006/0061008 A1 | 3/2006 | Karner et al. |
| 2006/0082192 A1 | 4/2006 | Dubay et al. |
| 2006/0132939 A1 | 6/2006 | Blank et al. |
| 2006/0255960 A1 | 11/2006 | Uken et al. |
| 2007/0019426 A1 | 1/2007 | Uken |
| 2007/0096005 A1 | 5/2007 | March et al. |
| 2008/0030883 A1 | 2/2008 | Oehmann |
| 2008/0055757 A1 | 3/2008 | Uken et al. |
| 2010/0033857 A1 | 2/2010 | Filipiak |
| 2010/0085653 A1 | 4/2010 | Uken et al. |
| 2010/0091394 A1 | 4/2010 | DeWind |
| 2010/0097469 A1 | 4/2010 | Blank et al. |
| 2015/0022914 A1 | 1/2015 | Uken et al. |

FOREIGN PATENT DOCUMENTS

| | | |
|---|---|---|
| WO | WO 2004/026633 | 4/2004 |
| WO | WO 2004/042457 | 5/2004 |
| WO | WO 2004/076971 | 9/2004 |
| WO | WO 2010/111173 | 9/2010 |
| WO | WO 2010/124064 | 10/2010 |

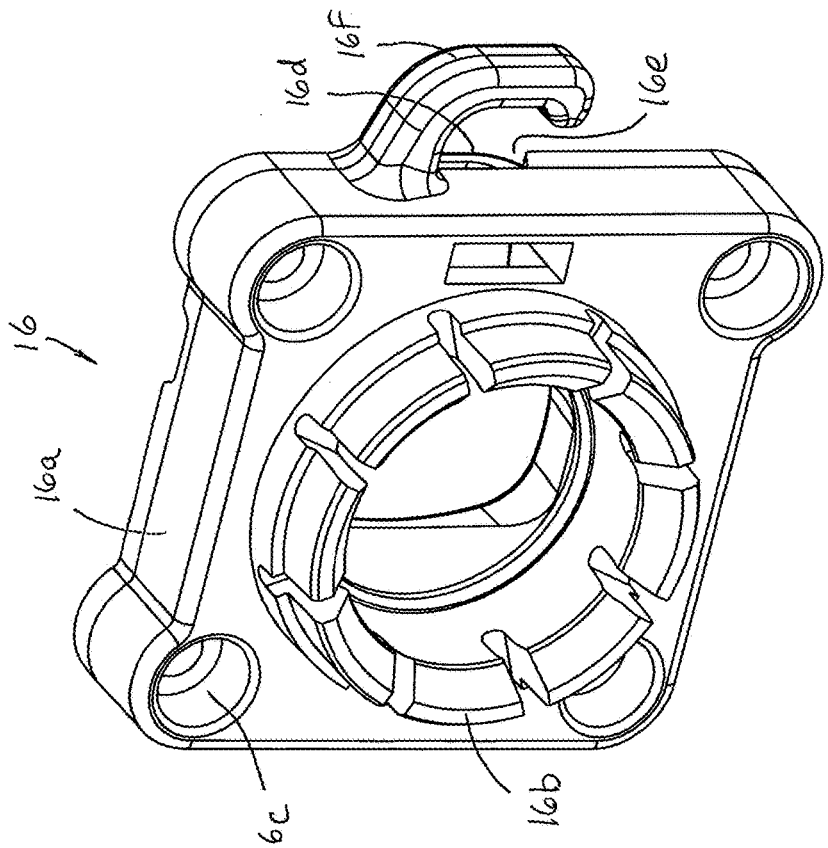
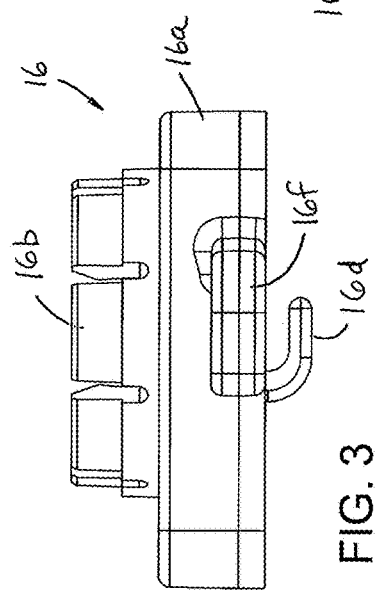
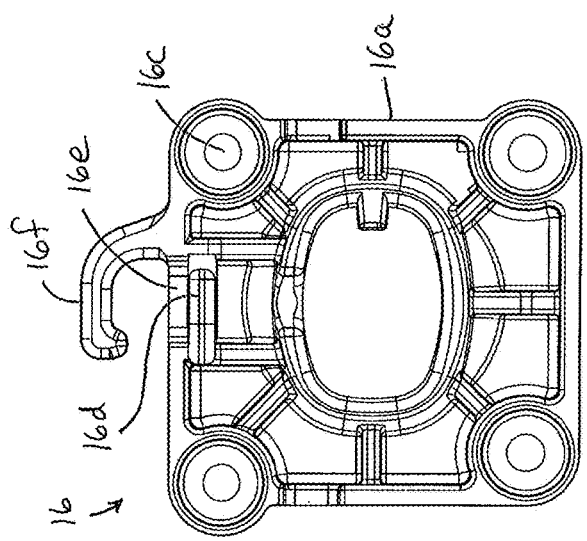

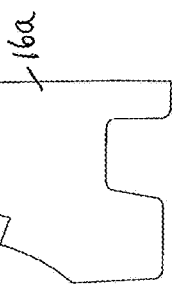
FIG. 6
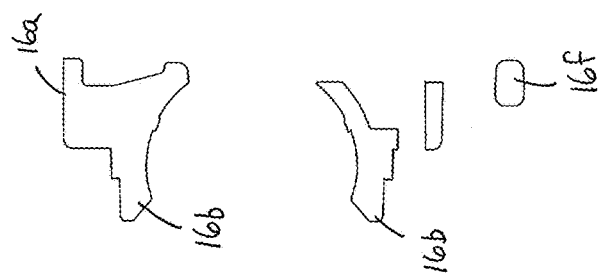
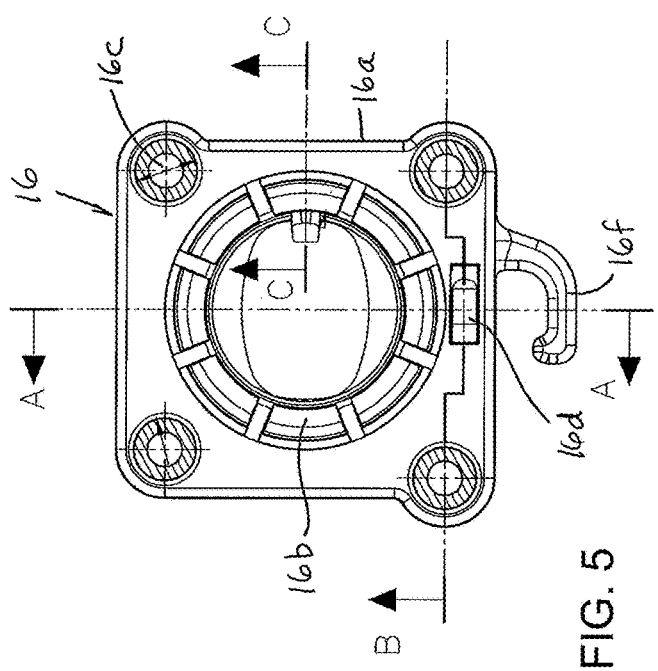
FIG. 5
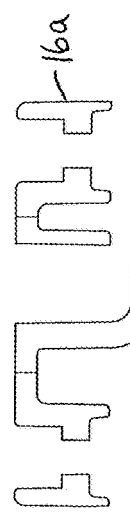
FIG. 7
FIG. 8

PROCESS FOR PROVIDING AN INTERIOR REARVIEW MIRROR ASSEMBLY

CROSS REFERENCE TO RELATED APPLICATIONS

The present application is a continuation of U.S. patent application Ser. No. 14/071,085, filed Nov. 4, 2013, now U.S. Pat. No. 9,352,691, which claims the filing benefits of U.S. provisional applications, Ser. No. 61/729,111, filed Nov. 21, 2012, and Ser. No. 61/722,392, filed Nov. 5, 2012, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. Typically, the socket portion of a single ball or single pivot construction is attached at or part of the rear of the mirror housing or casing, and the reflective element and the back plate (and circuitry disposed thereat) are attached at the front of the mirror casing.

SUMMARY OF THE INVENTION

The present invention provides an interior rearview mirror assembly that includes a reflective element and backplate, with a separate socket element attached at the backplate for pivotally mounting the backplate to a ball member of a mounting structure. The separate socket element is selected for the particular application of the mirror assembly, and may be selected to provide sufficient support and torque properties for the particular mirror assembly and mirror content. Thus, a universal backplate and mirror casing may be used, and a particular socket element (having the desired mechanical and metallurgical properties for that application) may be selected for use in a particular mirror assembly or application.

These and other objects, advantages, purposes and features of the present invention will become apparent upon review of the following specification in conjunction with the drawings.

BRIEF DESCRIPTION OF THE DRAWINGS

FIG. 2 is a perspective view of a socket element of the present invention;

FIG. 3 is a side elevation of the socket element of FIG. 2;

FIG. 4 is a bottom plan view of the socket element of FIG. 2;

FIG. 5 is a top plan view of the socket element of FIG. 2;

FIG. 6 is a sectional view of the socket element, taken along the line VI-VI in FIG. 5;

FIG. 7 is a sectional view of the socket element, taken along the line VII-VII in FIG. 5;

FIG. 8 is a sectional view of the socket element, taken along the line VIII-VIII in FIG. 5;

DESCRIPTION OF THE PREFERRED EMBODIMENTS

Figure 1:
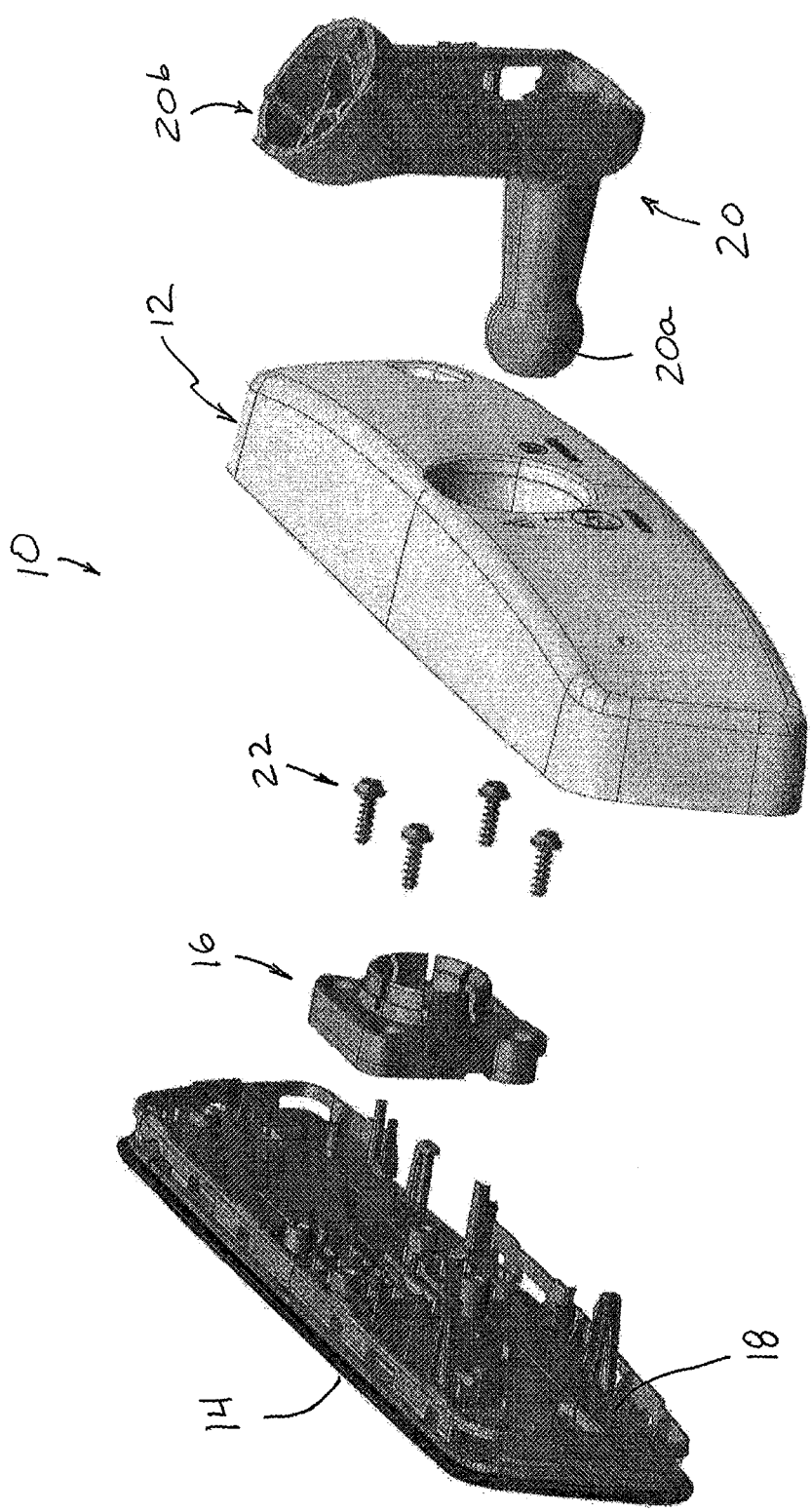
FIG. 1 is an exploded perspective view of an interior rearview mirror assembly in accordance with the present invention.

Referring now to the drawings and the illustrative embodiments depicted therein, an interior rearview mirror assembly 10 (FIG. 1) for a vehicle includes a reflective element 14 positioned at a front portion of a mirror housing or casing 12 and a pivot element or socket element 16 for pivotally attaching the reflective element 14 (and a mirror backplate 18 attached thereto, such as via an adhesive or tape or the like) to a mounting base or base portion 20, which is configured for attachment at an interior surface of a vehicle (such as to an interior surface of a vehicle windshield or a mirror mounting button at the interior surface of the vehicle windshield, or to a headliner of a vehicle or the like). The socket element 16 is a separate and distinct element/construction from the mirror backplate 18 and is configured to be attachable thereto (such as via fasteners and/or via a snap attachment or press fit attachment or via adhesive attachment or the like) in a separate and distinct operation to provide the desired or appropriate or selected properties of the selected socket element at the mirror backplate to provide the desired or appropriate pivotal attachment of the mirror head to the mounting base 20, as discussed below.

The reflective element 14 and mirror casing 12 are adjustable relative to the base portion 20 to adjust the driver's rearward field of view when the mirror assembly is normally mounted at or in the vehicle. In the illustrated embodiment, the mounting assembly comprises a single-ball or single-pivot mounting assembly whereby the reflective element and casing are adjustable relative to the vehicle windshield (or other interior portion of the vehicle) about a single pivot joint. Optionally, the mounting assembly may comprise other types of mounting configurations, such as a double-ball or double-pivot mounting configuration or the like, while remaining within the spirit and scope of the present invention. The socket or pivot element 16 is configured to receive a ball member 20a of the base portion 20, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226, 628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties).

The mounting base 20 includes an attaching portion 20b that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties).

Figure 11:
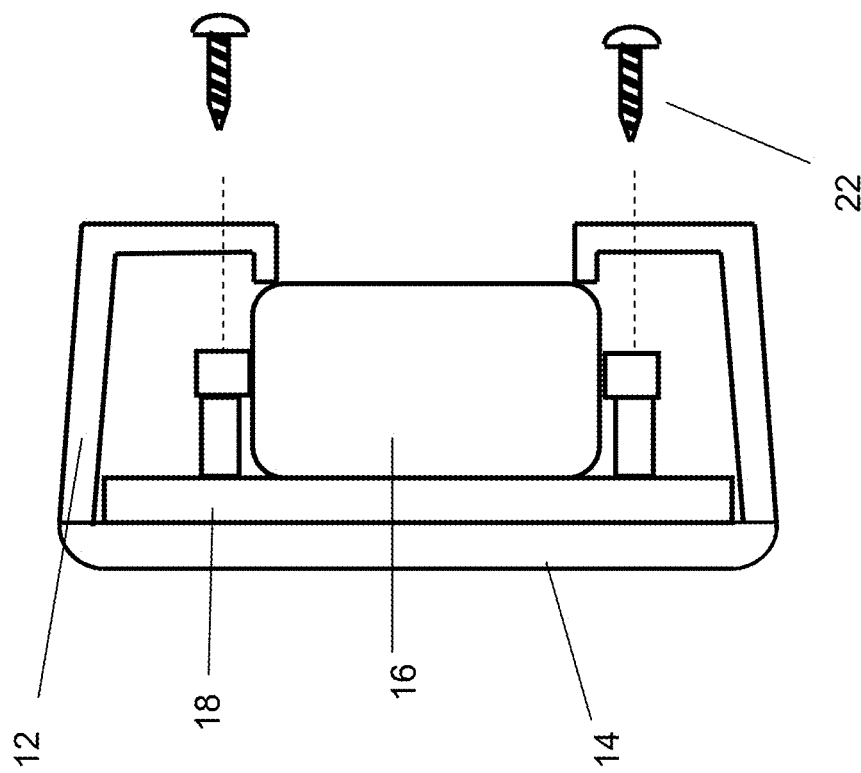
FIG. 11 is a side elevation partial sectional view of an interior rearview mirror assembly of the present invention.
Figure 12:
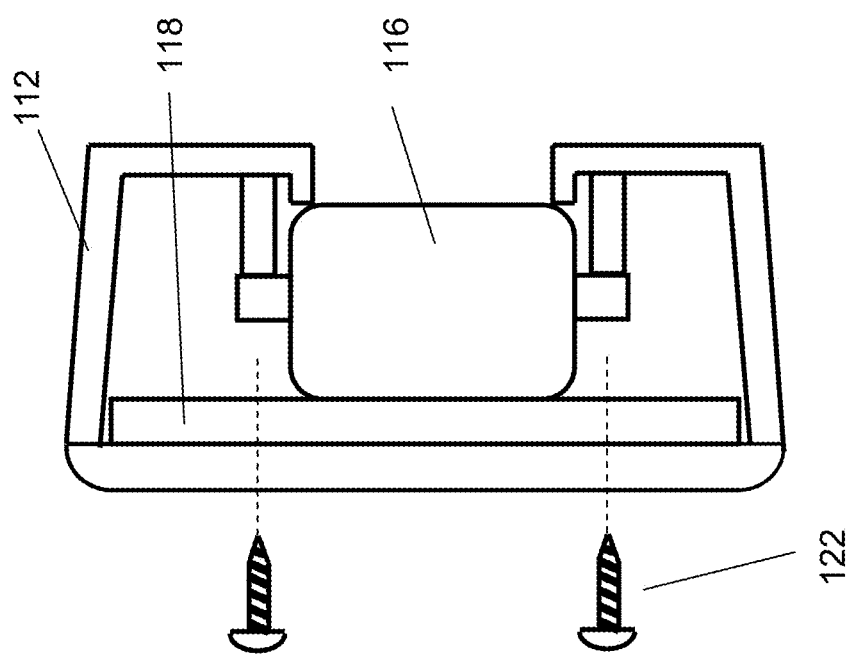
FIG. 12 is a side elevation partial sectional view of a known construction interior rearview mirror assembly.

As shown in FIGS. 1 and 11, the socket element 16 is mechanically attached (such as via fasteners 22) directly to the attachment plate or backplate 18, which is adhered to the rear surface of the reflective element 14, as opposed to being attached to the mirror casing housing 12. This is in contrast to known constructions (such as shown in FIG. 12), where the pivot element or socket element 116 is attached or fastened to the mirror casing 112, such as via one or more fasteners 122 or the like, such that the load path from the pivot joint goes through the mirror casing to the back plate 118 instead of directly to the back plate.

The present invention offers several advantages over the prior art. For example, and in reference to FIG. 1, ball member 20a of mounting base 20 can first pass through or thread through the aperture 12a of mirror casing 12 and then can be pressed into the receiving socket of socket element 16. Advantageously, this is done before socket element 16 attaches either to the backplate 18 or directly to the rear of the mirror reflective element 14. Insertion of the ball member 20a into the socket of socket element 16 can involve substantial forces and by doing this sub-assembly step separate and distinct from the backplate 18 and the mirror reflective element 14 (in other words, with the socket element not attached at the backplate or mirror reflective element), no stress and/or impact is made on or at the backplate 18 and/or the mirror reflective element 14. Thus, the materials used for backplate 18 and/or mirror reflective element 14 need not be capable of withstanding such high stresses/forces and may, for example, be made thinner and/or lighter and/or of less costly materials. Also, although shown in FIG. 1 with the ball member 20a extending on a stalk of the mounting base 20 so as to be received by the socket of socket element 16, alternatively, a ball member and stalk can extend from the element attached at the backplate to pass through the aperture 12a of mirror casing 12 so as to be received in a socket of a mounting base, while remaining within the spirit and scope of the present invention.

The separate and distinct or decoupled socket element 16 construction of the present invention may allow for use of a stronger material (such as an ABS material (such as an injection molding grade of ABS), such as a polycarbonate ABS material (PC/ABS), such as, for example, the commercially available Bayer MaterialScience BAYBLEND® T85 XF Polycarbonate+ABS material or HH-112 ABS or the like) for the attachment plate to help with glass strength (so that the glass substrate or substrates may be thinner or the like), while using a different material (having the desired flexibility and strength, and such as an acetal material and/or a polypropylene material or the like, such as, for example, the commercially available THERMYLENE® P-20TC-5100 polypropylene material (comprising a twenty percent talc-filled, heat stabilized, homopolymer polypropylene), or such as other glass-filled or talc-filled acetal materials or polypropylene materials or such as a Polyoxymethylene (POM) or glass filled or glass fiber reinforced POM or the like) for the separate socket element in order to enhance bracket torque feel. The mounting base 20 may then comprise a plastic or polymeric material, or may comprise a metallic material, such as aluminum or zinc or the like, while still providing the desirable vibration performance to the mirror assembly. The separate and distinct or decoupled socket element 16 construction of the present invention also allows for greater vibration performance since the vibration is no longer going through the housing or casing 12 and its snap attachments at the bezel portion.

Figure 9:
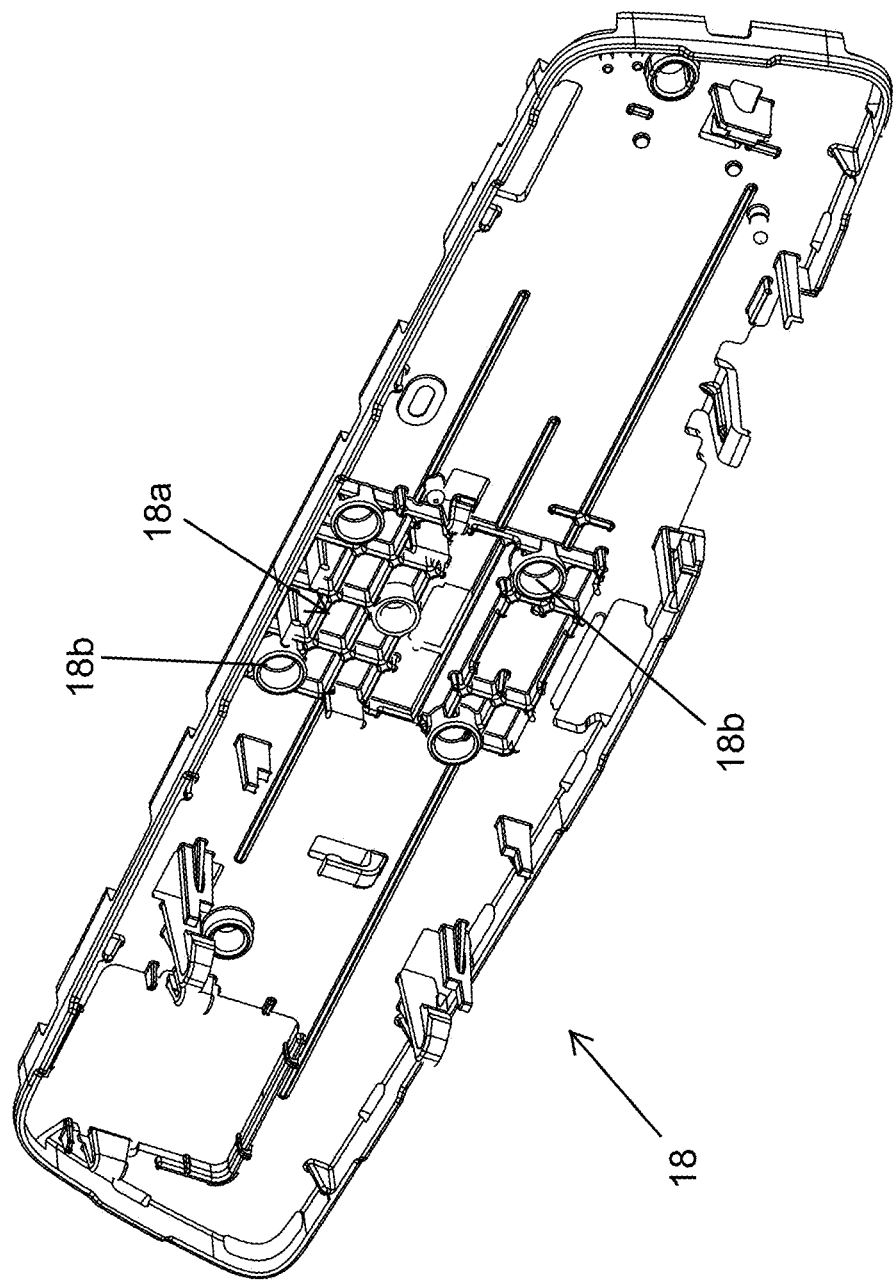
FIG. 9 is a perspective view of a backplate or attachment plate suitable for use in an interior rearview mirror assembly of the present invention.

As best shown in FIGS. 2-8, the socket element 16 comprises a base or attaching portion 16a and a plurality of flexible tabs 16b that form a flexible socket that flex apart to receive the ball member 20a therein when the mirror head is mounted at the base portion 20 and that retain the socket element 16 and backplate 18 and reflective element 14 relative to the ball member 20a and base portion 20. In the illustrated embodiment, the attaching portion 16a has a plurality of apertures or passageways 16c for receiving fasteners 22 therethrough for fastening the socket element 16 to the back plate. As shown in FIG. 9, the backplate 18 provides an attachment area or surface 18a at which the socket element 16 is disposed and includes threaded bosses or passageways 18a for receiving (such as threadedly receiving) the fasteners 22 therein to secure the socket element 16 at the backplate 18. Optionally, the attaching portion may include a plurality of tabs or snap elements for snap-attaching the socket element to corresponding tabs or snap elements of the back plate, while remaining within the spirit and scope of the present invention. Thus, the socket element 16 may be fixedly secured to the back plate 18, which may be adhered to the rear of the reflective element or otherwise secured relative to the reflective element.

The back plate 18 may comprise a common or universal backplate, whereby the appropriate or selected socket element or pivot element (such as a socket element or such as a ball element or the like) is attached to the backplate to provide the desired pivot joint for the particular mirror head in which the backplate is incorporated. Optionally, when molding the backplate, a different insert may be provided to integrally mold a portion of or all of a ball member or the like (such as a portion of a base of a ball member, whereby the ball member may comprise a metallic ball member that is insert molded at the base and at the rear of the backplate during the injection molding process that forms the backplate, such as by utilizing aspects of the mirror assemblies described in U.S. Pat. Nos. 7,855,755; 7,249,860 and 6,329,925 and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties).

Optionally, a common backplate may be provided with an aperture at a generally central region of the backplate, and a separate and distinct socket element may be disposed at the aperture through the backplate when the backplate and socket element are disposed at or adhered at the rear of the reflective element. In such a configuration, the backplate may be attached at the rear of the reflective element (such as via an adhesive or tape or the like) and the separate socket element may be adhered or bonded at the rear of the reflective element within the aperture of the backplate. Optionally, the backplate may include one or more attachment elements or clasps or the like that may further retain the socket element at the rear of the reflective element. For example, the backplate may be attached or adhered at the rear of the reflective element and, as part of a separate operation, the socket element may be inserted into or received in and through the aperture of the backplate and attached or adhered at the rear of the reflective element and/or snapped into attaching elements of the backplate to retain the separate socket element at the rear of the reflective element.

As shown in FIG. 1, the ball member 20a is received through an aperture 12a of the mirror casing 12 (which may be snapped or press fit attached or otherwise attached at the backplate and/or reflective element) and is received in the socket or receiving portion formed by the flexible tabs 16b of the socket element 16. The mounting base 20 may be attached at the interior surface of the vehicle and the mirror head (comprising the already assembled backplate and reflective element and socket element and mirror casing) may be readily snapped (or press fit attached or otherwise attached) to the ball member 20a to pivotally attach the mirror head to the mounting base.

Figure 10:
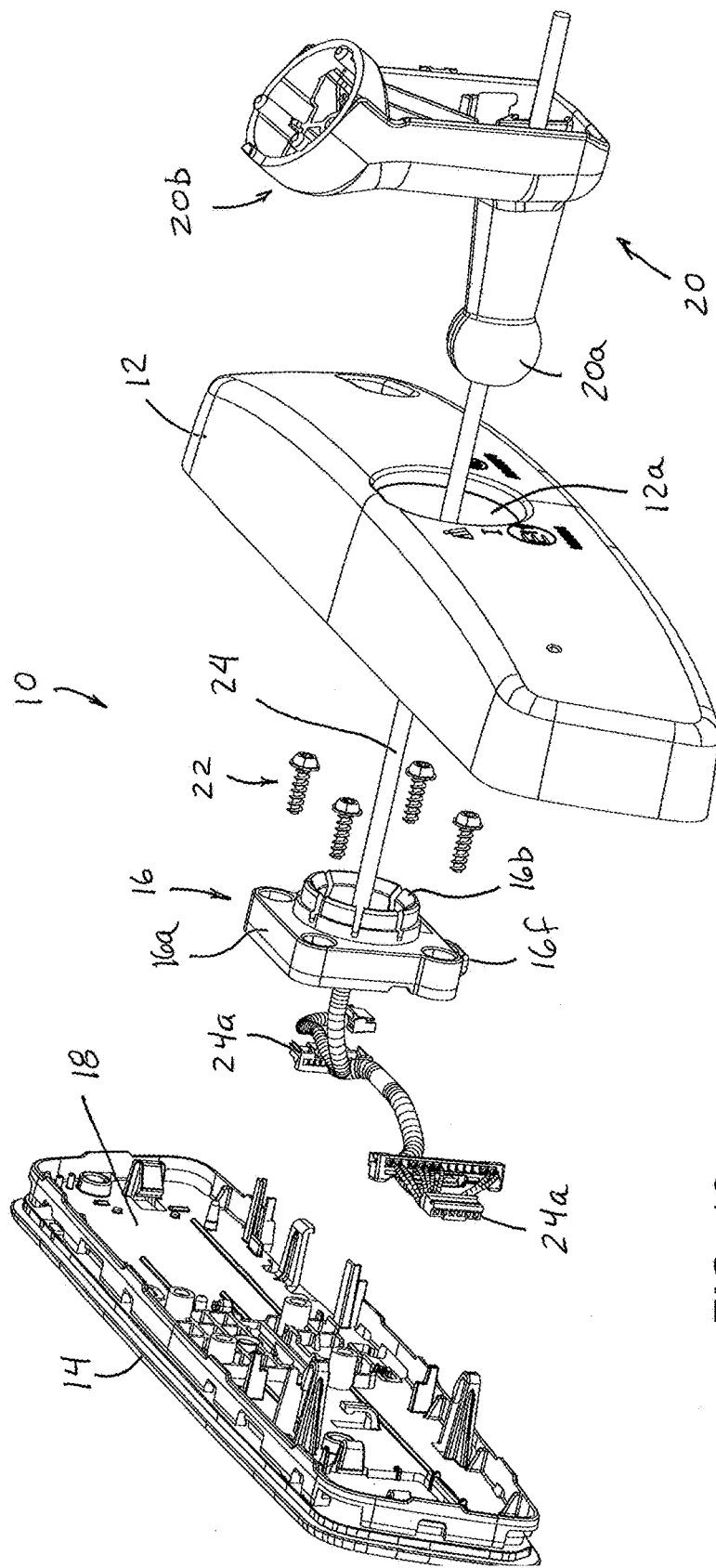
FIG. 10 is an exploded perspective view of another interior rearview mirror assembly in accordance with the present invention.

Optionally, and preferably, and such as shown in FIG. 10, the circuitry or accessories of the mirror assembly (such as circuitry and the like established at a printed circuit board attached at or established at the backplate) may be electrically connected to vehicle wiring or circuitry via a wiring harness or wires or cable 24 that is/are fed through or passed through the mounting base 20 and through the ball member 20a and to one or more electrical connectors 24a for electrically connecting the wires to one or more electrical connectors at the circuit board and/or backplate of the mirror assembly. As shown in FIGS. 2-8, the socket element 16 may include a wire guide or tab or arm 16d for guiding and holding the cable 24 at the appropriate location to route the cable along a notch 16e of the socket element, whereby the cable is routed over a second wire guide or tab or arm 16f to retain the cable relative to the socket element 16.

Thus, the separate socket element allows for routing of the cable through the mounting base and through the socket before completing the assembly of the mirror head. For example, the cable may be routed through the mirror casing 12 and through the socket element 16 and along tabs 16d, 16f, whereby the socket element 16 (with the cable secured thereat) may be attached to the backplate 18. When so attached, the mirror casing may be attached at the backplate and/or reflective element and the socket element may be snapped or press fit attached to the ball member of the mounting base, with the cable routed therethrough. Such a configuration thus may provide enhanced assembly processing and wire management.

The common backplate thus may comprise any suitable backplate having the desired or appropriate strength and rigidity (particularly for frameless mirror reflective elements and the like), while the socket element may be selected to provide a desired or selected diameter socket for receiving a particular sized ball member (such as a ball member having a diameter of greater than about 10 mm and less than about 30 mm, such as, for example, a ball member having a diameter of around 22 mm or the like) for the particular vehicular application of the mirror assembly. Similarly, the socket element may be selected to provide a desired torque (such as between about 1 Nm and about 3 Nm of torque, or between about 1.5 Nm and about 2.5 Nm of torque, or between about 1.4 Nm and about 2.2 Nm of torque, such as, for example, about 1.8 Nm of torque) at the ball member that is received in the socket when the mirror head is pivotally attached at the base portion at the vehicle.

The present invention, by attaching the socket element at the backing plate instead of the mirror casing, provides for use of a larger ball member (such as, for example, a 28 mm diameter ball member) and also provides enhanced vibration performance. For example, a mirror assembly with the socket attached at the mirror casing may have a vibration performance of around 64 Hz, while a mirror assembly of the present invention, with the socket attached at the backing plate, may have a vibration performance of around 87 Hz.

Figure 13:
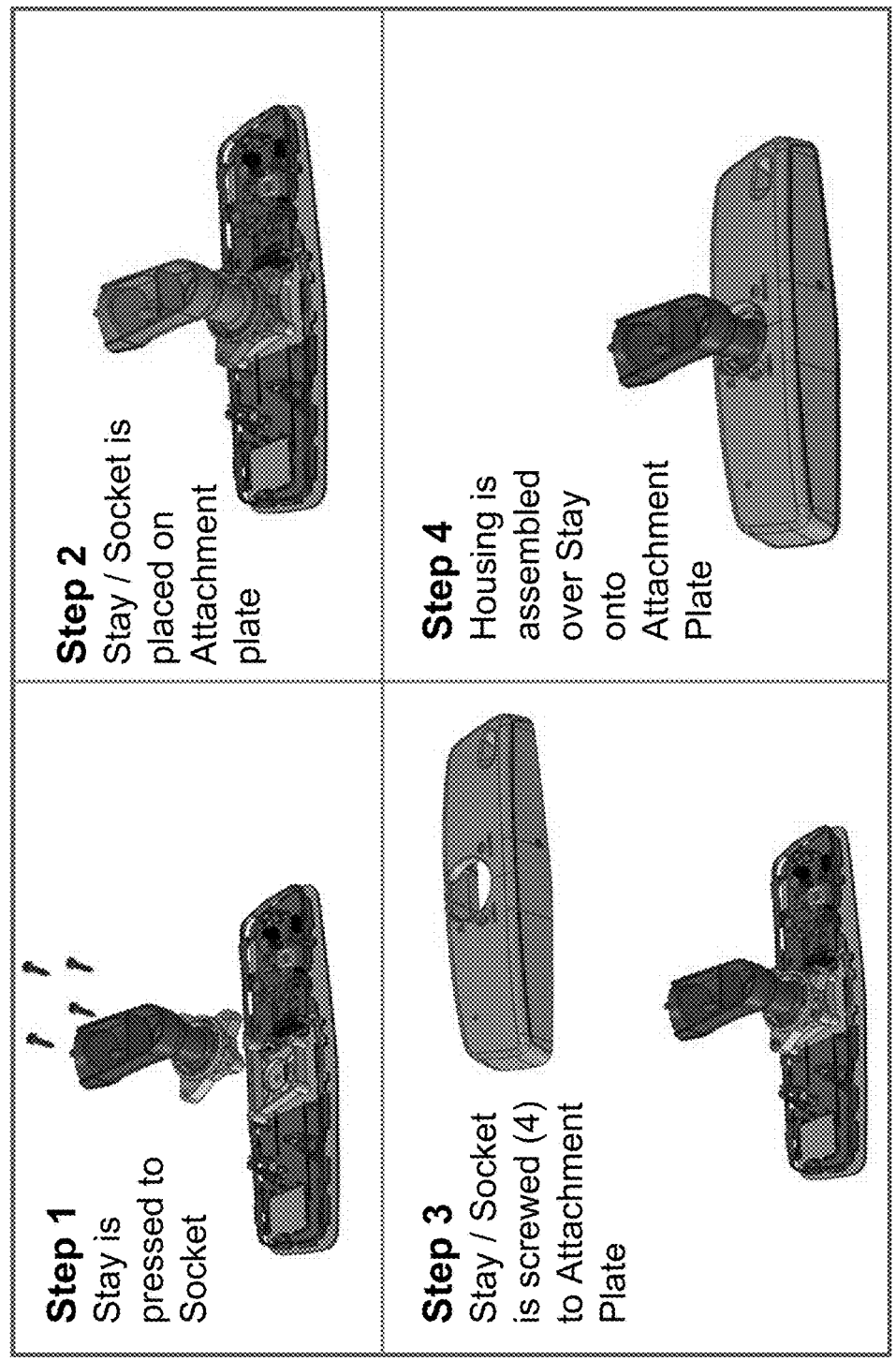
FIG. 13 shows perspective views of the assembly process for an interior rearview mirror assembly of the present invention.
Figure 14:
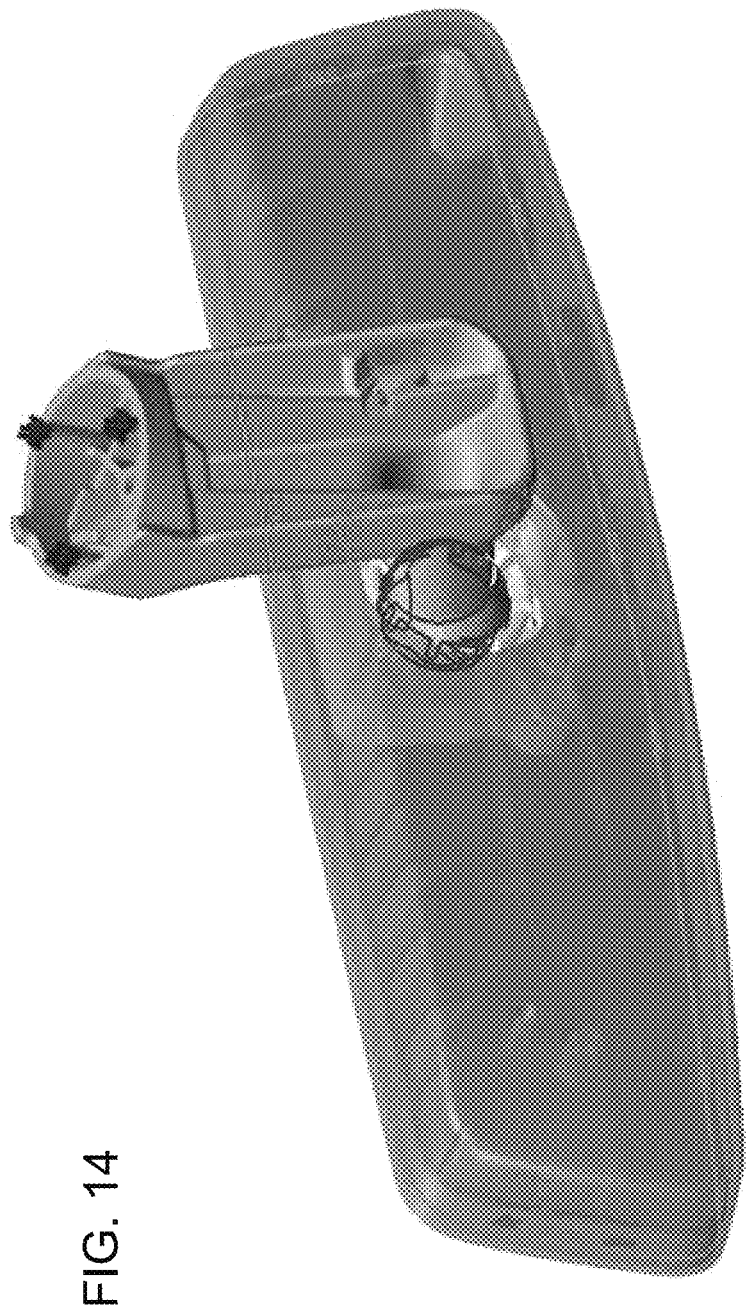
FIG. 14 is a perspective view of the assembled interior rearview mirror assembly of FIG. 13.

The present invention thus may allow for a mirror assembly to utilize a larger ball member (such as, for example, a 28 mm ball member or thereabouts) and thus may provide enhanced vibration performance and enhanced torque and the like. With reference to FIGS. 13 and 14, such a mirror assembly may be assembled by pressing the ball member or stay or mounting base into the socket before the socket element is attached to the back plate. At this time, any wiring that may be routed through the mounting base and/or ball member may be routed through the socket element. The socket element is then placed at the backing plate (and any electrical wiring may at that time be electrically connected to circuitry at the backing plate), and then is attached or fastened at the backing plate (such as via one or more fasteners or such as via a snap attachment or the like). After the socket element (with the ball member pivotally received therein) is attached at the backing plate, the vehicle attaching portion of the mounting base may be fed through the aperture in the mirror casing and the mirror casing may be attached at the backing plate and/or reflective element. Such a construction allows for a larger diameter ball member without having to create a larger diameter aperture through the mirror casing (so long as the aperture through the mirror casing is sufficiently sized to receive the vehicle attaching portion of the mounting base or stay therethrough).

The larger diameter ball member provides benefits over smaller diameter constructions, such as, for example, the larger diameter ball member allows for assembly of the housing over the stay, and allows for direct attachment of the socket element to the attachment plate, and provides a load path that is direct to the heavy components of the mirror, and achieves the same load path as a two ball or double pivot design, and provides improved vibration performance (for example, the vibration performance may improve from about 64 Hz to about 87 Hz). The torque at the ball or pivot joint may be any suitable or desired torque and may be selected via changing the inner diameter of the socket element. For example, multiple socket elements may be formed or provided for a particular ball size, and a particular socket element (having the desired inner diameter) may be selected to provide the desired torque for a particular application. The multiple socket elements may be provided with inner diameters that vary slightly, such as in 0.1 mm increments, so that a heavier mirror assembly (having greater electronic content) may utilize a smaller inner diameter socket element than the same mirror assembly with lesser electronic content.

Therefore, the separate socket element construction of the present invention provides for enhanced assembly and allows for different materials to be used for the backplate and the socket element. Thus, the present invention may provide a common or universal backplate or backplate material (with the backplate comprising a plastic backplate formed in an injection molding operation or the like) that provides enhanced strength at the back of the reflective element, while the separate socket (which is decoupled from the backplate and formed separately from the backplate in a separate forming operation, such as in a separate and distinct injection molding operation or the like) may comprise a different material to provide the desired support and torque characteristics at the ball member of the mounting base. Optionally, different sized and different material socket elements may be selected for attachment to and use with common backplates, depending on the particular mirror application (such as the particular size and/or weight of the mirror head and/or the particular mirror content and/or the particular mounting base and/or the like).

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or PCT Application No. PCT/US2011/056295, filed Oct. 14, 2011 and published on Apr. 19, 2012 as International Publication No. WO 2012/051500, and/or PCT Application No. PCT/US2012/064398, filed Nov. 9, 2012 and published May 16, 2013 as International Publication No. WO 2013/071070, which are hereby incorporated herein by reference in their entireties (and with electrochromic and prismatic mirrors of such construction are commercially available from the assignee of this application under the trade name INFINITY™ mirror).

In the illustrated embodiment, the interior rearview mirror assembly is designed and constructed as an electrochromic mirror assembly having a front glass substrate, with the front glass substrate of the electrochromic laminate element being constructed with its first surface/outermost perimeter edges slanted or beveled or rounded or the like, such as shown/described in U.S. Des. Pat. Nos. D633,423; D633,019; D638,761 and/or D647,017, and/or PCT Application No. PCT/US2011/056295, filed Oct. 14, 2011, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or PCT Application No. PCT/US2012/064398, filed Nov. 9, 2012 and published May 16, 2013 as International Publication No. WO 2013/071070, which are hereby incorporated herein by reference in their entireties, in order to obviate/avoid a sharp edge at the front or outermost perimeter surface of the mirror reflective element and mirror assembly that could potentially hurt/injure an occupant of a vehicle equipped with the interior rearview mirror assembly during an accident. The mirror casing 12 may comprise any suitable mirror casing, and may comprise a plastic or polymeric molded casing or housing.

Although shown as an electrochromic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, published Apr. 8, 2010, which are hereby incorporated herein by reference in their entireties.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, published Apr. 8, 2010, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or PCT Application No. PCT/US2012/064398, filed Nov. 9, 2012 and published May 16, 2013 as International Publication No. WO 2013/071070, which are hereby incorporated herein by reference in their entireties, or such as proximity sensors of the types described in U.S. Pat. Nos. 7,224,324; 7,249,860 and/or 7,446,924, and/or PCT Application No. PCT/US03/40611, filed Dec. 19, 2003 and published on Jul. 15, 2004 as PCT Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,477,464; 6,946,978; 7,308, 341; 7,167,796; 7,004,593; 7,657,052 and/or 6,678,614, and/or U.S. patent application Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent applications, Ser. No. 13/023,750, filed Feb. 9, 2011, now U.S. Pat. No. 8,890,955, Ser. No. 11/226,628, filed Sep. 14, 2005 and published Mar. 23, 2006 as U.S. Pat. Pub. No. US-2006-0061008, and/or Ser. No. 10/538,724, filed Jun. 13, 2005 and published Mar. 9, 2006 as U.S. Pat. Pub. No. US-2006-0050018, Ser. No. 12/091,525, filed Apr. 25, 2008 and published Jan. 15, 2009 as U.S. Pat. Pub. No. US-2009-0015736; Ser. No. 12/091,525, filed Apr. 25, 2008 and published Jan. 15, 2009 as U.S. Pat. Pub. No. US-2009-0015736; Ser. No. 12/578,732, filed Oct. 14, 2009 and published Apr. 22, 2010 as U.S. Pat. Pub. No. US-2010-0097469; Ser. No. 09/585,379, filed Jun. 1, 2000, now abandoned; and/or Ser. No. 10/207,291, filed Jul. 29, 2002, now abandoned, and/or PCT Application No. PCT/US10/47256, filed Aug. 31, 2010, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. patent application Ser. No. 10/534,632, filed May 11, 2005 and published Aug. 3, 2006 as U.S. Pat. Pub. No. US-2006-0171704, Ser. No. 12/091,359, filed Jun. 10, 2008 and published Oct. 1, 2009 as U.S. Pat. Pub. No. US-2009-0244361; and/or Ser. No. 12/377,054, filed Feb. 10, 2009 and published Aug. 26, 2010 as U.S. Pat. Pub. No. US-2010-0214791, and/or PCT Application No. PCT/US08/78700, filed Oct. 3, 2008 and published Apr. 9, 2009 as International Publication No. WO 2009/046268, and/or PCT Application No. PCT/US08/76022, filed Sep. 11, 2008 and published Mar. 19, 2009 as International Publication No. WO 2009/036176, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in PCT Application No. PCT/US10/25545, filed Feb. 25, 2010 and published Sep. 2, 2010 as International Pub. No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include other electrically operated or powered accessories, such as a compass sensor and compass display. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, and/or U.S. patent application Ser. No. 11/226, 628, filed Sep. 14, 2005 and published Mar. 23, 2006 as U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092 and/or 7,004,593, which are all hereby incorporated herein by reference in their entireties. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety.

Optionally, it is envisioned that aspects of the present invention may be suitable for an interior rearview mirror assembly that comprises a prismatic mirror assembly or a non-electro-optic mirror assembly (such as a generally planar or optionally slightly curved mirror substrate) or an electro-optic or electrochromic mirror assembly. For example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

The mirror assembly may comprise or utilize aspects of other types of casings or the like, such as described in U.S. Pat. Nos. 7,338,177; 7,289,037; 7,249,860; 6,439,755; 4,826,289 and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. patent applications, Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. patent applications, Ser. No. 10/538,724, filed Jun. 13, 2005 and published Mar. 9, 2006 as U.S. Pat. Pub. No. US-2006-0050018; and/or Ser. No. 12/091,525, filed Apr. 25, 2008 and published Jan. 15, 2009 as U.S. Pat. Pub. No. US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. patent application Ser. No. 10/538,724, filed Jun. 13, 2005 and published Mar. 9, 2006 as U.S. Pat. Pub. No. US-2006-0050018, which are hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. patent application Ser. No. 11/239,980, filed Sep. 30, 2005 and published Jun. 15, 2006 as U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and PCT and U.S. patent applications being commonly assigned and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Although shown and described as comprising an interior rearview mirror assembly attached at an interior portion of a vehicle, aspects of the present invention may be suitable for use in an exterior rearview mirror assembly attached at a side of a vehicle. For example, aspects of the present invention may be suitable for use in exterior rearview mirror assemblies of the types described in PCT Application No. PCT/US2012/064398, filed Nov. 9, 2012 and published May 16, 2013 as International Publication No. WO 2013/071070, and/or PCT Application No. PCT/US2013/027346, filed Feb. 22, 2013 and published Aug. 29, 2013 as International Publication No. WO 2013/126719, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A process for providing an interior rearview mirror assembly for a vehicle, said process comprising:
    providing a mirror reflective element comprising at least one transparent substrate and a mirror reflector established at a surface of said at least one transparent substrate;
    forming a mirror backplate;
    forming a mounting base, wherein said mounting base is formed separate from said mirror backplate, and wherein said mounting base is configured for attachment at an interior portion of a vehicle, said mounting base comprising a ball member;
    forming a socket element, wherein said socket element is formed separate from said mirror backplate and separate from said mounting base, said socket element comprising a socket member and an attaching structure, wherein forming said socket element comprises integrally forming said socket member and said attaching structure;
    inserting said ball member of said mounting base into said socket member of said socket element to form a ball and socket joint whereby said mounting base pivotally attaches to said socket element;
    attaching said mirror backplate at said mirror reflective element; and
    after said mirror backplate is attached at said mirror reflective element, and after said mounting base is pivotally attached to said socket element, and with said attaching structure of said socket element directly contacting said mirror backplate, attaching said attaching structure of said socket element to said mirror backplate.

2. The process of claim 1, wherein said socket element is attached at said mirror backplate via at least one fastener.

3. The process of claim 1, wherein electrical wiring passes through said ball member and through said socket member, said electrical wiring making electrical connection to circuitry at said mirror backplate.

4. The process of claim 1, wherein said mirror backplate comprises a first material and said socket element comprises a second material, and wherein said second material is different than said first material.

5. The process of claim 4, wherein said first material comprises an ABS material.

6. The process of claim 5, wherein said second material comprises at least one of (i) an acetal material and (ii) a polypropylene material.

7. The process of claim 1, wherein said mounting base is formed by molding a plastic resin.

8. The process of claim 1, comprising providing a mirror casing having an aperture therethrough.

9. The process of claim 8, comprising passing said ball member of said mounting base through aperture of said mirror casing.

10. The process of claim 1, wherein said ball member inserts into said socket member by press fit attachment.

11. The process of claim 1, wherein said mounting base is formed by molding a plastic resin and wherein said ball member is formed of metal, and wherein said metal ball member is insert molded into said mounting base during its formation by molding.

12. The process of claim 1, wherein said ball and socket joint exhibits a torque in the range of 1 Nm of torque to 3 Nm of torque.

13. The process of claim 1, wherein said ball member has a diameter of at least 28 mm.

14. An interior rearview mirror assembly provided in accordance with the process of claim 1.

15. A process for providing an interior rearview mirror assembly for a vehicle, said process comprising:
    providing a mirror reflective element comprising at least one transparent substrate and a mirror reflector established at a surface of said at least one transparent substrate;
    forming a mirror backplate in a plastic molding operation;
    forming a mounting base, wherein said mounting base is formed separate from said mirror backplate, and wherein said mounting base is configured for attachment at an interior portion of a vehicle, said mounting base comprising a ball member;
    forming a socket element in a plastic molding operation, wherein said socket element is formed separate from said mirror backplate and separate from said mounting base, said socket element comprising a socket member and an attaching structure, wherein forming said socket element comprises integrally forming said socket member and said attaching structure via the plastic molding operation;
    inserting said ball member of said mounting base into said socket member of said socket element to form a ball and socket joint whereby said mounting base pivotally attaches to said socket element;
    adhering said mirror backplate at said mirror reflective element; and
    after said mirror backplate is adhered at said mirror reflective element, and after said mounting base is pivotally attached to said socket element, and with said attaching structure of said socket element directly contacting said mirror backplate, attaching said attaching structure of said socket element to said mirror backplate.

16. The process of claim 15, wherein said mounting base is formed by molding a plastic resin.

17. The process of claim 16, wherein said ball member is formed of metal and wherein said metal ball member is insert molded into said mounting base during its formation by molding.

18. The process of claim 16, wherein said ball and socket joint exhibits a torque in the range of 1.4 Nm of torque to 2.2 Nm of torque.

19. The process of claim 16, wherein said ball member has a diameter of at least 28 mm.

20. An interior rearview mirror assembly provided in accordance with the process of claim 15.

21. A process for providing an interior rearview mirror assembly for a vehicle, said process comprising:

providing a mirror reflective element comprising at least one transparent substrate and a mirror reflector established at a surface of said at least one transparent substrate;

forming a mirror backplate in a plastic molding operation;

forming a mounting base, wherein said mounting base is formed separate from said mirror backplate, and wherein said mounting base is configured for attachment at an interior portion of a vehicle, said mounting base comprising a ball member;

forming a socket element in a plastic molding operation, wherein said socket element is formed separate from said mirror backplate and separate from said mounting base, said socket element comprising a socket member and an attaching structure, wherein forming said socket element comprises integrally forming said socket member and said attaching structure via the plastic molding operation;

inserting said ball member of said mounting base into said socket member of said socket element to form a ball and socket joint whereby said mounting base pivotally attaches to said socket element;

adhering said mirror backplate at said mirror reflective element;

with said mirror backplate adhered at said mirror reflective element, and with said mounting base pivotally attached to said socket element, and with said attaching structure of said socket element contacting said mirror backplate, attaching said attaching structure of said socket element to said mirror backplate;

providing a mirror casing with an aperture at a rear portion thereof that is dimensioned for said mounting base to pass therethrough; and passing said mounting base through said aperture of said mirror casing after said attaching structure of said socket element is attached to said mirror backplate.

22. The process of claim 21, wherein at least one of (i) said ball and socket joint exhibits a torque in the range of 1.4 Nm of torque to 2.2 Nm of torque, and (ii) said ball member has a diameter of at least 28 mm.

23. An interior rearview mirror assembly provided in accordance with the process of claim 21.

* * * * *